(12) United States Patent
Lu et al.

(10) Patent No.: US 11,226,546 B2
(45) Date of Patent: Jan. 18, 2022

(54) DETECTING DEVICE FOR USE IN MULTIPLE-DOF SPHERICAL BODY

(71) Applicant: TRIDSEARCH CO., LTD., New Taipei (TW)

(72) Inventors: Hsueh-Lung Lu, New Taipei (TW); Chien-Chih Chang, New Taipei (TW)

(73) Assignee: TRIDSEARCH CO., LTD., New Taipei (TW)

( * ) Notice: Subject to any disclaimer, the term of this patent is extended or adjusted under 35 U.S.C. 154(b) by 0 days.

(21) Appl. No.: 16/998,429

(22) Filed: Aug. 20, 2020

(65) Prior Publication Data

US 2021/0055634 A1 Feb. 25, 2021

(51) Int. Cl.
*G03B 17/56* (2021.01)
*G01B 11/24* (2006.01)

(52) U.S. Cl.
CPC ............ *G03B 17/561* (2013.01); *G01B 11/24* (2013.01)

(58) Field of Classification Search
CPC ...... G03B 17/561; G03B 15/00; G01B 11/24; G01B 11/30; G01N 21/88; A63B 45/00
See application file for complete search history.

(56) References Cited

U.S. PATENT DOCUMENTS

| 4,532,723 A * | 8/1985 | Kellie | G21C 17/06 |
| | | | 356/73 |
| 2021/0234451 A1* | 7/2021 | Mahajan | H02K 41/03 |

FOREIGN PATENT DOCUMENTS

| KR | 101644815 B1 * | 8/2016 | |
| NL | 7811112 A * | 5/1980 | ......... G01B 11/2408 |
| TW | 201818049 A * | 5/2018 | |
| TW | M577113 U * | 4/2019 | |

* cited by examiner

*Primary Examiner* — Christopher E Mahoney
(74) *Attorney, Agent, or Firm* — Guice Patents PLLC

(57) ABSTRACT

A detecting device for use in multiple-DOF spherical body, which is applied in a camera and a spherical body, and includes: a fasten plate; at least one rotation mechanism; at least one rolling device; and at least one elevation device; and characterized in: the fasten plate has a bottom plate and plural bottom support rods are disposed between the bottom plate and the fasten plate, the bottom plate has a second rotation mechanism having a second fasten plate and a motor output shaft, the fasten plate has a second elevation device at the bottom and a elevation plate at the top and has a second top rotation disk set and a rotation disk input shat, connection guiding rods are disposed between the elevation plate and the second fasten plate, and the second top rotation disk set has a tray and at least one spherical body holding ring.

8 Claims, 10 Drawing Sheets

DETECTING DEVICE FOR USE IN MULTIPLE-DOF SPHERICAL BODY

BACKGROUND OF THE INVENTION

1. Field of the Invention

The present invention relates to a detecting device, especially to a detecting device for use in multiple-DOF (degree of freedom) spherical body.

2. Description of Related Art

Taiwan Patent Application No. 106134285 and Taiwan Patent Publication No. 201818049 have disposed a convention detecting device for use in a surface of a spherical member, a main structure of the detecting device is to be provided with a camera part at an upper end of a bottom plate, a center of the bottom plate is disposed with a supply part which provides a spherical member, the front, the rear, the left and the right defined on a surface of the bottom plate are respectively disposed with a direction adjusting part, with rotation parts of a plurality of rolling wheels disposed at four directions defined therein, the spherical member can be in contact and the spherical member can be assisted by a plurality of supporting points, so that the spherical member can be suspended and can be rotated so as to be detected in four directions, the rotation parts having the rolling wheels require a complicated circuit control part for being precisely and synchronously positioned, the rotation parts of the rolling wheels have to be sequentially rotated for allowing the spherical member to be rotated in various directions and enabling the spherical member to be detected in various directions; however, the spherical member may be easily loosened or even fall out and could not be stably supported, or even inclined or not in a correction position, and the structure thereof is complicated, thus disadvantages of not easy in maintenance, high production cost and high malfunction rate are caused, and the practicability thereof is very much limited; accordingly, the above-mentioned disadvantages shall be improved by the skilled people in the air for providing a better product to the consumer. The applicant of the present invention has invented a detecting device for use in multiple-DOF spherical body, which has been granted with Taiwan Patent Registration No. M577113 (corresponding to Taiwan Patent Application No. 107214164), the patent has disclosed that a lower end of a fasten plate is disposed with an elevation device and a guiding column extending and penetrating the fasten plate, an upper end of the guiding column is disposed with a rotation mechanism having a passive wheel, a rotation motor and a transmission member, the passive wheel of the rotation mechanism is additionally disposed with a rolling device having a rolling wheel and a rolling motor, an upper end of the rolling wheel of the rolling device is disposed with a tray and a spherical member holding ring, one end of the tray is connected to a vertical column which is connected to the fasten plate; the rotation mechanism and the rolling device can be elevated through the elevation device, the camera can perform a detecting operation through the rolling wheel and the tray of the rolling device and a lower end of the spherical member of the spherical member holding ring being in contact and rotating, the rolling wheel of the rolling device and the lower end of the spherical member are separated through the elevation device being descended, and the rotation mechanism is able to drive the rolling device and the rolling wheel to be rotated and turned for allowing the elevation device to be elevated again so as to enable the spherical member to be rotated in various directions; accordingly, the spherical member being rapidly supported and positioned can be effectively enhanced, single rolling wheel is required for allowing the spherical member to be rotated with various degrees of freedom so as to enable the camera to perform a detecting operation in various directions, thereby achieving effects of simple in assembly, convenient in maintenance and low in product cost and malfunction rate; however, the patent has improved the prior art but the tray is in a fixed status, the detecting operation is achieved through the elevations of the elevation device which allows the lower end of the spherical member to be in contact with the rolling wheel, when the elevation device is stopped and not descended, the tray is unable to perform an elevation operation for replacing the election device, the tray is not provided with a plurality of spherical member holding rings and unable to be rotated in 360 degrees, and there is only one set thereof corresponding to the rolling device and the rotation mechanism, so that a plurality of spherical members cannot be detected in sequence at the same time, thus the applicant provides the present invention with a hope of providing a better technical solution.

SUMMARY OF THE INVENTION

For solving the disadvantages existed in the prior art, one primary objective of the present invention is to provide a detecting device for use in multiple-DOF (degree of freedom) spherical body, in which a second elevation device and a second rotation mechanism of a fasten plate are correspondingly connected to a bottom plate and an elevation plate and a tray; the disadvantages existed in the prior art can be overcome.

Another objective of the present invention is to provide a detecting device for use in multiple-DOF (degree of freedom) spherical body, in which a second elevation device and a second rotation mechanism are utilized for allowing an elevation plate having a second guiding column to be elevated and allowing a tray corresponding to a rolling wheel and having a through hole and a spherical body holding ring to be elevated and rotated, so that the spherical body is able to be rotated in various degrees of freedom for enabling a camera to perform a detecting operation in various directions.

One another objective of the present invention is to provide a detecting device for use in multiple-DOF (degree of freedom) spherical body, which has advantages of enhancing the operation convenience and allowing a plurality of spherical bodies to be rapidly and synchronously detected.

The problems to be solved by the present inventions are: in a convention detecting device for use in a surface of a spherical member, a main structure of the detecting device is to be provided with a camera part at an upper end of a bottom plate, a center of the bottom plate is disposed with a supply part which provides a spherical member, the front, the rear, the left and the right defined on a surface of the bottom plate are respectively disposed with a direction adjusting part, with rotation parts of a plurality of rolling wheels disposed at four directions defined therein, the spherical member can be in contact and the spherical member can be assisted by a plurality of supporting points, the rotation parts having the rolling wheels require a complicated circuit control part for being precisely and synchronously positioned, the rotation parts of the rolling wheels have to be sequentially rotated for allowing the spherical member to be rotated in various directions and enabling the spherical member to be detected in various directions; however, the spherical member may be easily loosened or even fall out and could not be stably supported, or even inclined or not in a correction position, and the structure thereof is complicated, thus disadvantages of not easy in maintenance, high production cost and high malfunction rate are caused, and the practicability thereof is very much limited; for solving the above-mentioned disadvantages, the applicant of the present invention has invented a detecting device for use in multiple-DOF spherical body, which has been granted with Taiwan Patent Registration No. M577113 (corresponding to Taiwan Patent Application No. 107214164); however, the patent has improved the prior art but the tray is in a fixed status, the detecting operation is achieved through the elevations of the elevation device which allows the lower end of the spherical member to be in contact with the rolling wheel, when the elevation device is stopped and not descended, the tray is unable to perform an elevation operation for replacing the elevation device, the tray is not provided with a plurality of spherical member holding rings and unable to be rotated in 360 degrees, and there is only one set thereof corresponding to the rolling device and the rotation mechanism, so that a plurality of spherical members cannot be detected in sequence at the same time, thus the applicant provides the present invention with a hope of providing a better technical solution.

For achieving said objectives and solving the above-mentioned disadvantages, one technical solution provided by the present invention is to provide a detecting device for use in multiple-DOF (degree of freedom) spherical body, which is applied in a camera and a spherical body, and includes: a fasten plate, disposed at a lower end of the camera; at least one rotation mechanism, disposed at an upper end defined at a periphery of the fasten plate and having a passive wheel, a rotation motor corresponding to the passive wheel, and a transmission member connected to the passive wheel and the rotation motor; at least one rolling device, disposed at an upper end of the passive wheel of the rotation mechanism and having a rolling wheel and a rolling motor, wherein a radial center of the rolling wheel is corresponding to a center of the passive wheel of the rolling device; and at least one elevation device, disposed at a lower end of the fasten plate, wherein the elevation device is connected to a lower end of the rotation mechanism through a plurality of guiding columns upwardly extending towards the upper end of the fasten plate and being disposed with a buffer spring, and characterized in that: a center of the fasten plate has a middle penetrated hole, a lower end of the fasten plate is disposed with a bottom plate and a plurality of bottom support rods are disposed between the bottom plate and the fasten plate, a center of the bottom plate has a bottom penetrated hole corresponding to the middle penetrated hole of the fasten plate, a lower end of the bottom plate is disposed with a second rotation mechanism corresponding to the bottom penetrated hole, an upper end of the second rotation mechanism is disposed with a second fasten plate, a center of the second fasten plate of the second rotation mechanism is disposed with a motor output shaft upwardly extending and penetrating the bottom penetrated hole and the middle penetrated hole, an upper end of the fasten plate is disposed with an elevation plate, a periphery of the elevation plate is downwardly extended with a plurality of second guiding columns penetrating the fasten plate and connected to the bottom support rod, the second guiding columns are respectively disposed with a buffer spring, an upper end of the elevation plate is disposed with a second top rotation disk set, one side defined at a lower end of the fasten plate is disposed with a second elevation device which pushes the bottom plate and allows the elevation plate and the bottom plate to be elevated, a plurality of connection guiding columns penetrating the middle penetrated hole are disposed between the elevation plate and the second fasten plate of the second rotation mechanism, an upper end of the second top rotation disk set is disposed with a tray and a center thereof is disposed with a rotation disk input shaft extending to a lower end of the second top rotation disk set, a shaft connector is disposed between the rotation disk input shaft and the motor output shaft of the second rotation mechanism, a periphery of the tray is disposed with a plurality of through holes which are corresponding to an upper end of the rolling wheel of the rolling device and allows a lower end of the spherical body to be mounted, an upper end of each of the through holes is disposed with at least one spherical body holding ring, the spherical body holding ring is disposed with an opening corresponding to the through hole and allowing a lower portion of the spherical body to be mounted, and the spherical body holding ring is formed in an annular shape consisted of at least one arc-shaped member.

Wherein, according to the present invention, the second elevation device has an eccentric wheel and an elevation motor or a cylinder which pushes the bottom plate for elevations.

Wherein, according to the present invention, the tray is formed in a round-disk shape Wherein, according to the present invention, the passive wheel of the rotation mechanism is a gear or a pulley.

Wherein, according to the present invention, the transmission member of the rotation mechanism is a gear or a belt.

Wherein, according to the present invention, the spherical body holding ring is disposed with a concave part adjacent to a periphery of the opening.

Wherein, according to the present invention, the arc-shaped member of the spherical body holding ring is formed in an annular shape consisted of single or multi-staged arc-shaped member.

Wherein, according to the present invention, the quantity of the annular shape of which the multi-staged arc-shaped member of the spherical body holding ring is consisted is two, three or four.

Comparing to the prior art, advantages achieved by the present invention are as follows: with the second elevation device and the second rotation mechanism of the fasten plate being correspondingly connected to the bottom plate and the elevation plate and the tray, the present invention can achieve following features: by utilizing the second elevation device and the second rotation mechanism, and providing the elevations of the elevation plate having the second guiding columns and the tray, which is corresponding to the rolling wheel and having the through holes and the spherical body holding ring, being elevated and rotated, the spherical body is able to rotate in various DOF status for allowing the camera to detect in various directions; as such, effects of effectively enhancing the operation convenience and allowing a plurality of the spherical bodies to be rapidly and synchronously detected can be achieved. Accordingly, the present invention is novel and more practical in use comparing to prior arts

DETAILED DESCRIPTION OF THE PREFERRED EMBODIMENT

One preferred embodiment of the present invention will be described with reference to the drawings for illustrating the structural assembly, the technical means and the functions to be achieved by the present invention; and the actual ratios and the arrangement of components shall not be limited by the ratios and the arrangement of components in the provided figures.

Figure 1:
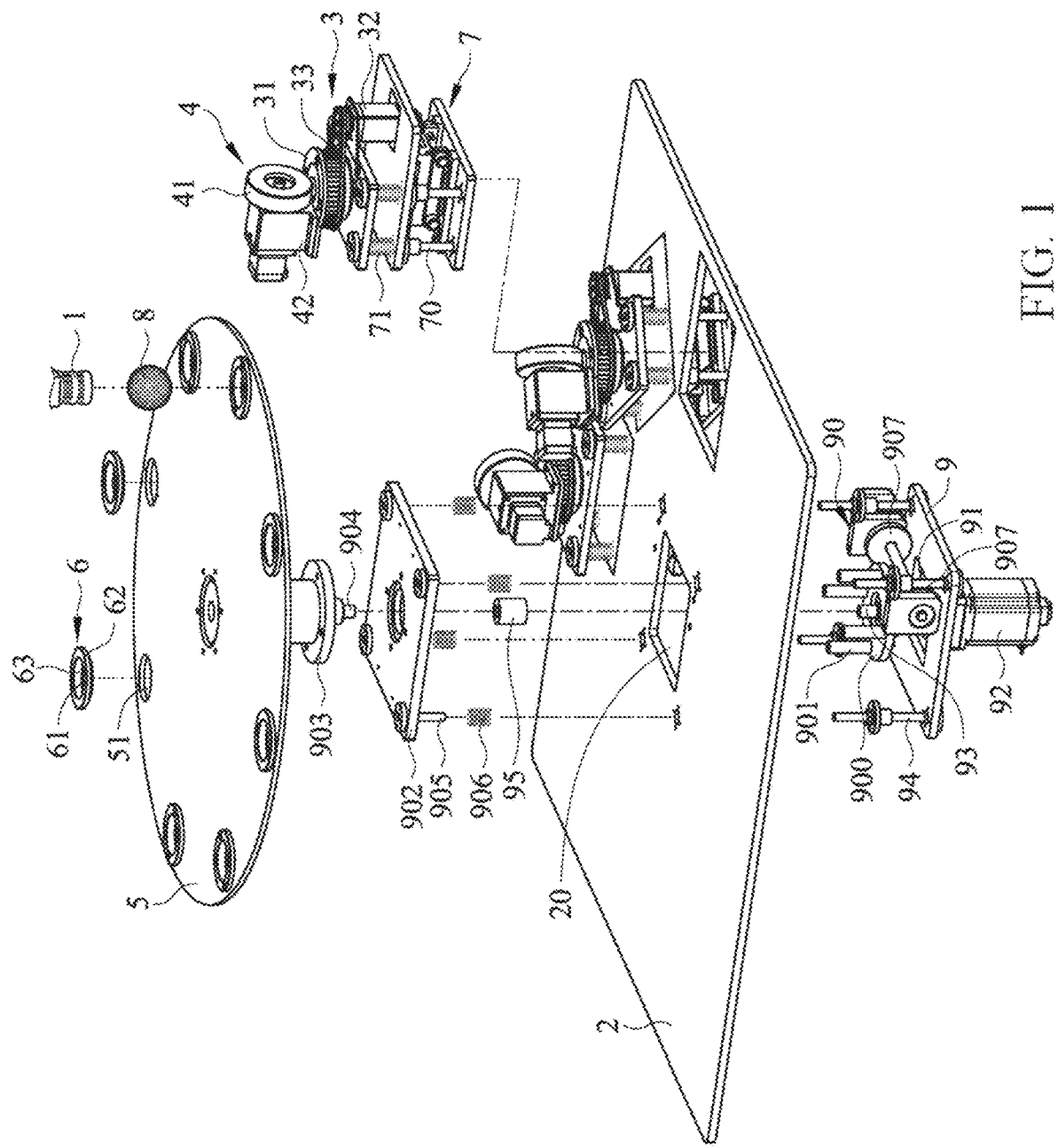
FIG. 1 is a perspective exploded view according to the present invention.
Figure 2:
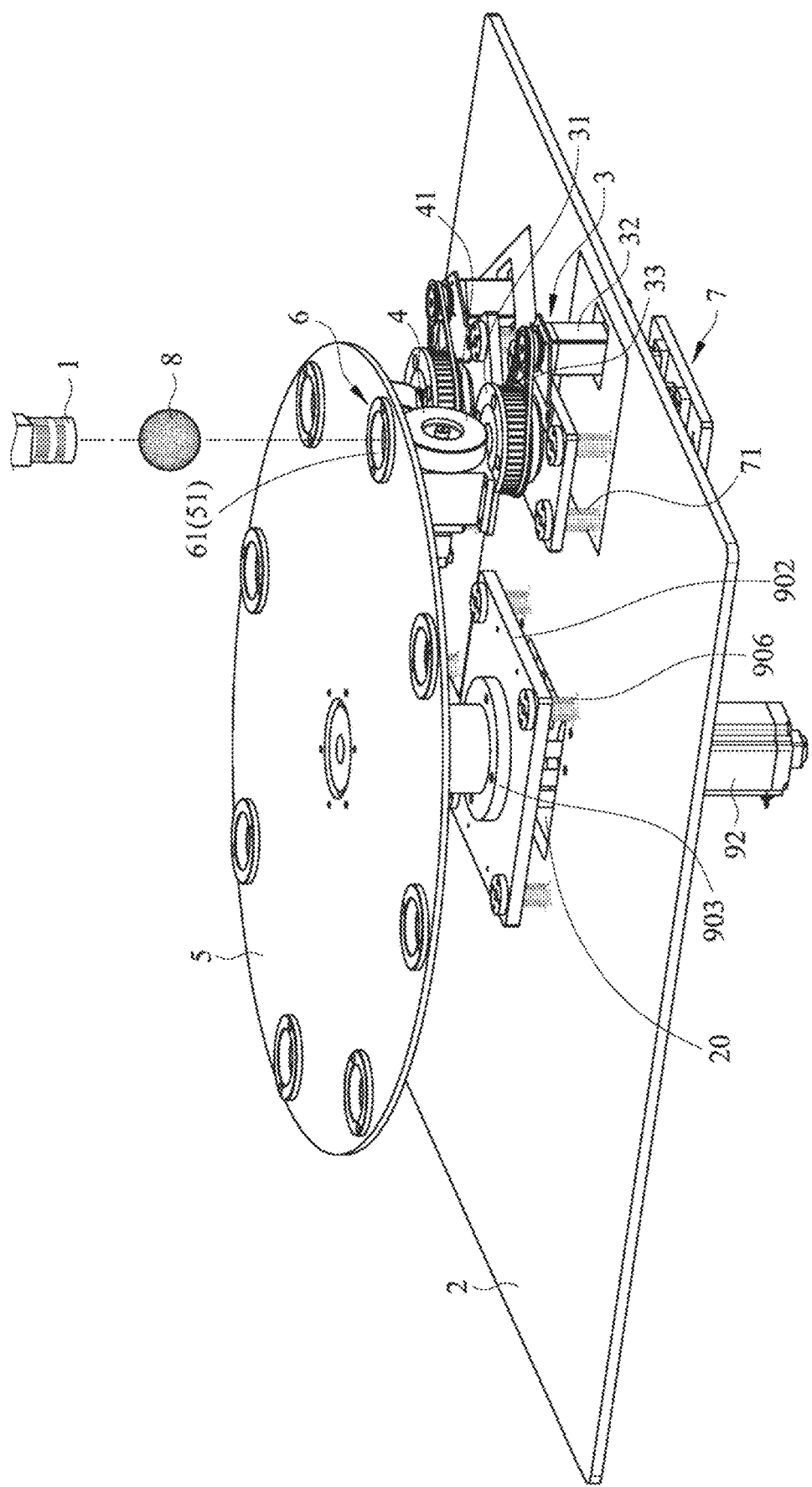
FIG. 2 is a perspective view showing the assembly according to the present invention.
Figure 3:
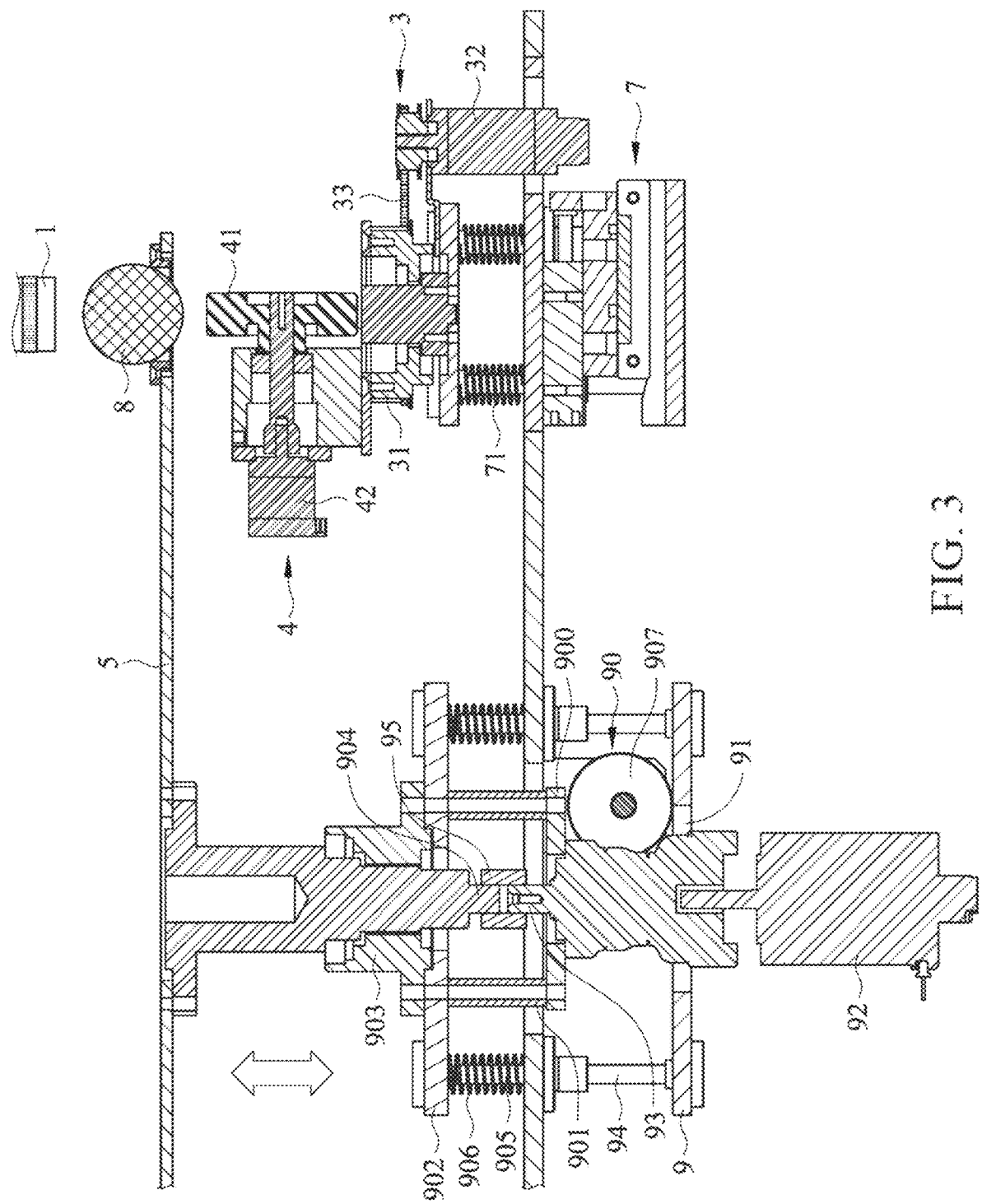
FIG. 3 is a cross sectional view showing the assembly according to the present invention.
Figure 4:
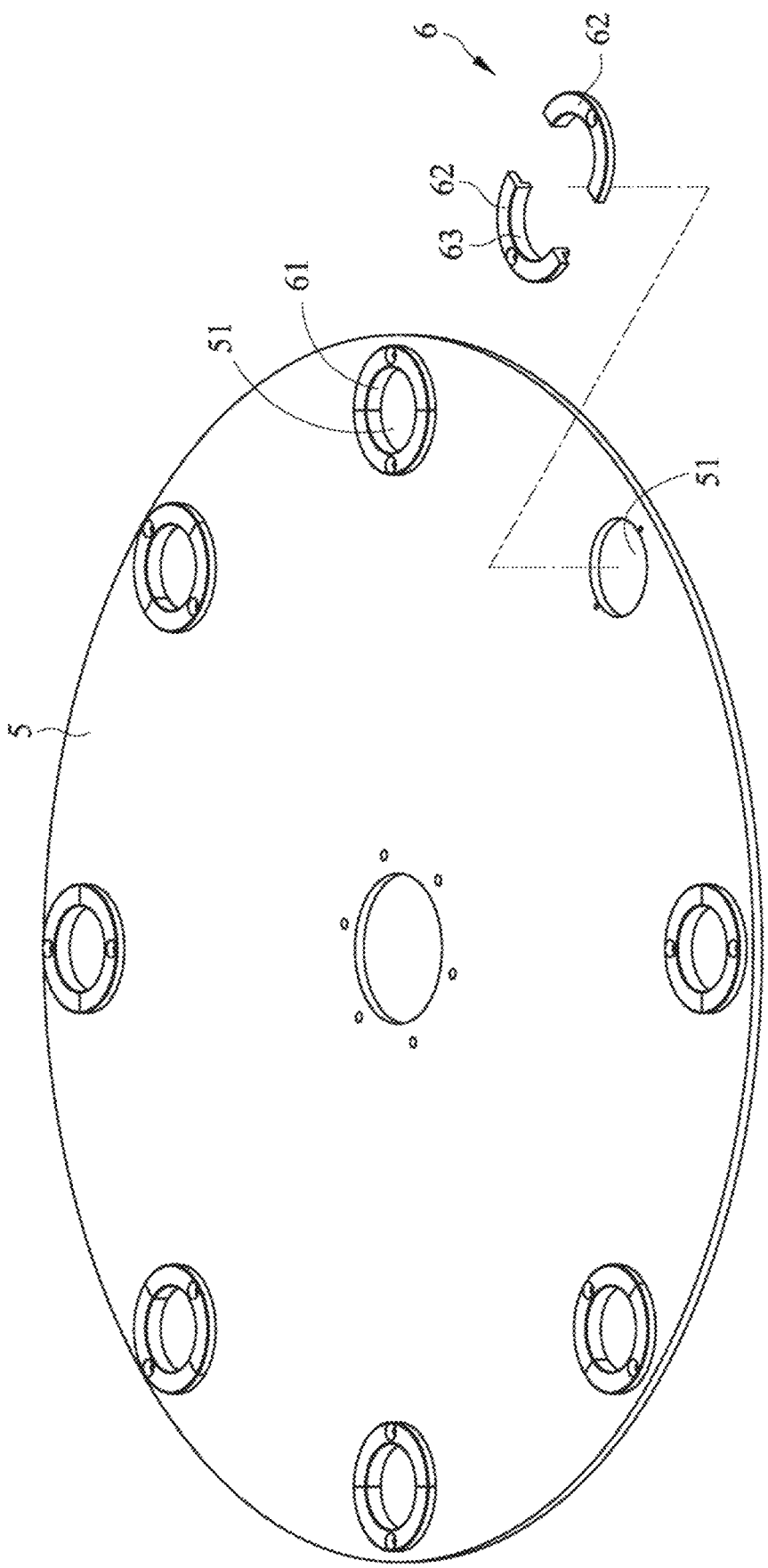
FIG. 4 is a schematic view showing the quantity of the annular shape of which the arc-shaped member of the spherical body holding ring being consisted being two according to one embodiment of the present invention.
Figure 5:
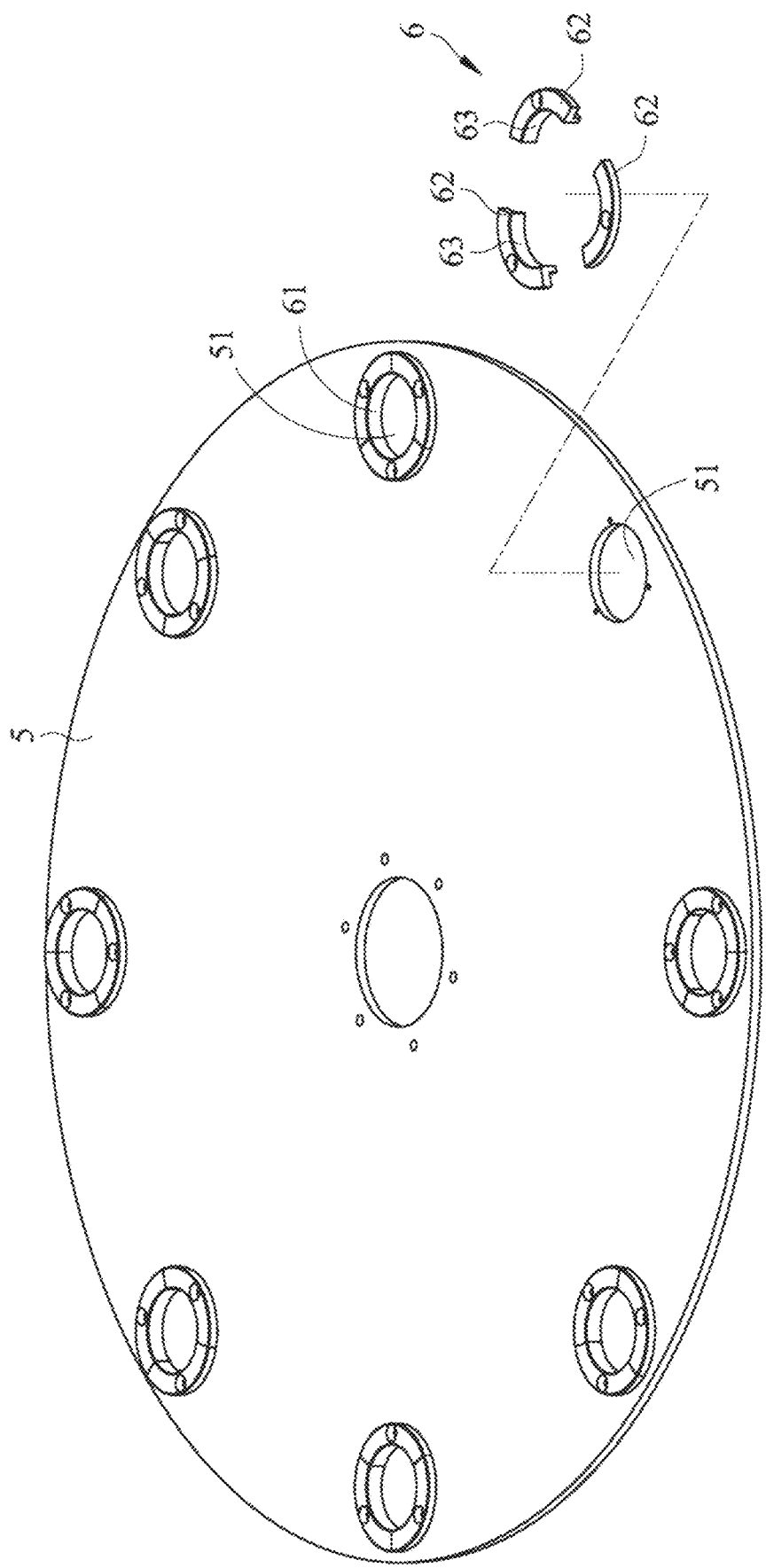
FIG. 5 is a schematic view showing the quantity of the annular shape of which the arc-shaped member of the spherical body holding ring being consisted being three according to one embodiment of the present invention.
Figure 6:
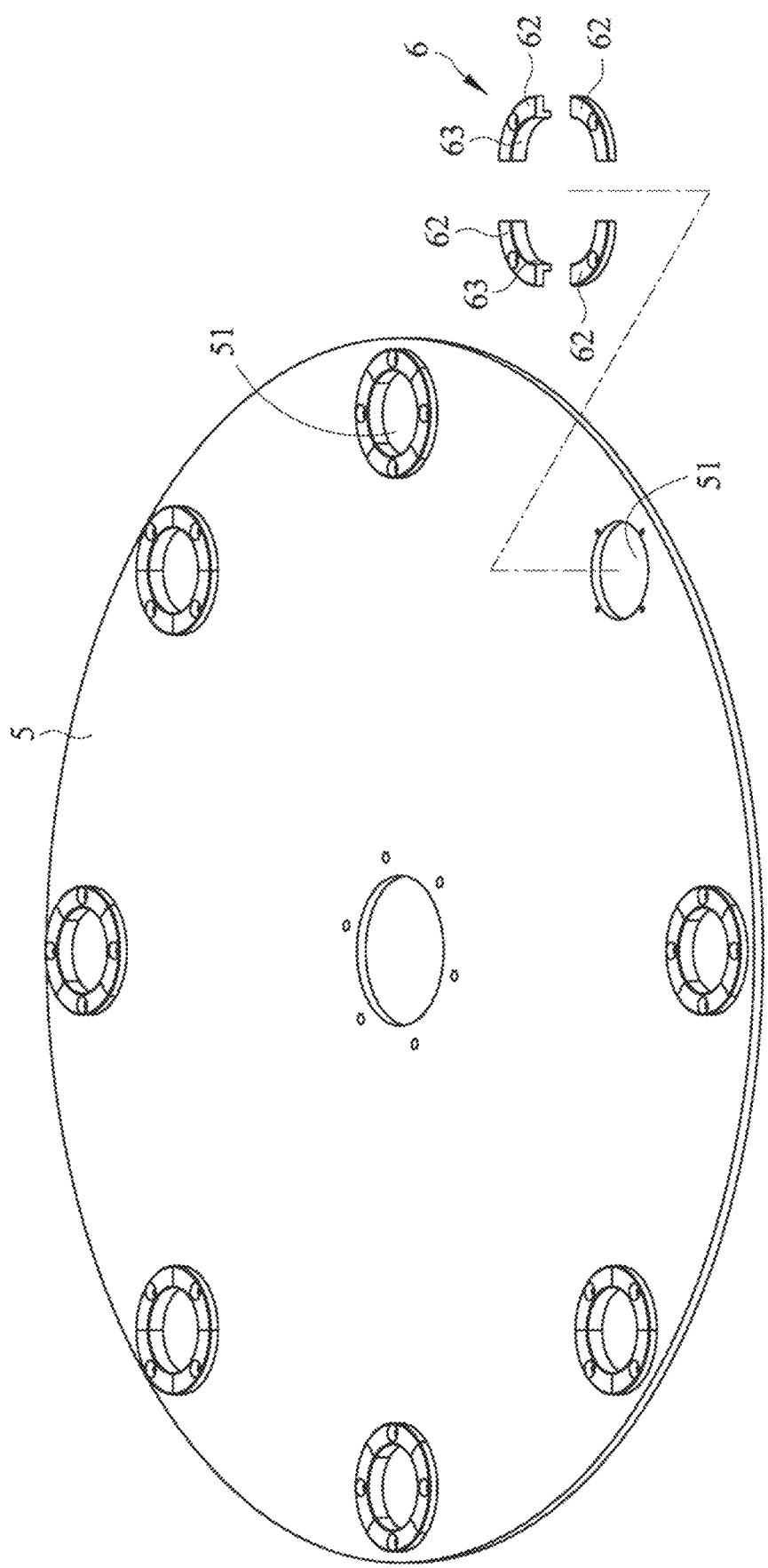
FIG. 6 is a schematic view showing the quantity of the annular shape of which the arc-shaped member of the spherical body holding ring being consisted being four according to one embodiment of the present invention.
Figure 7:
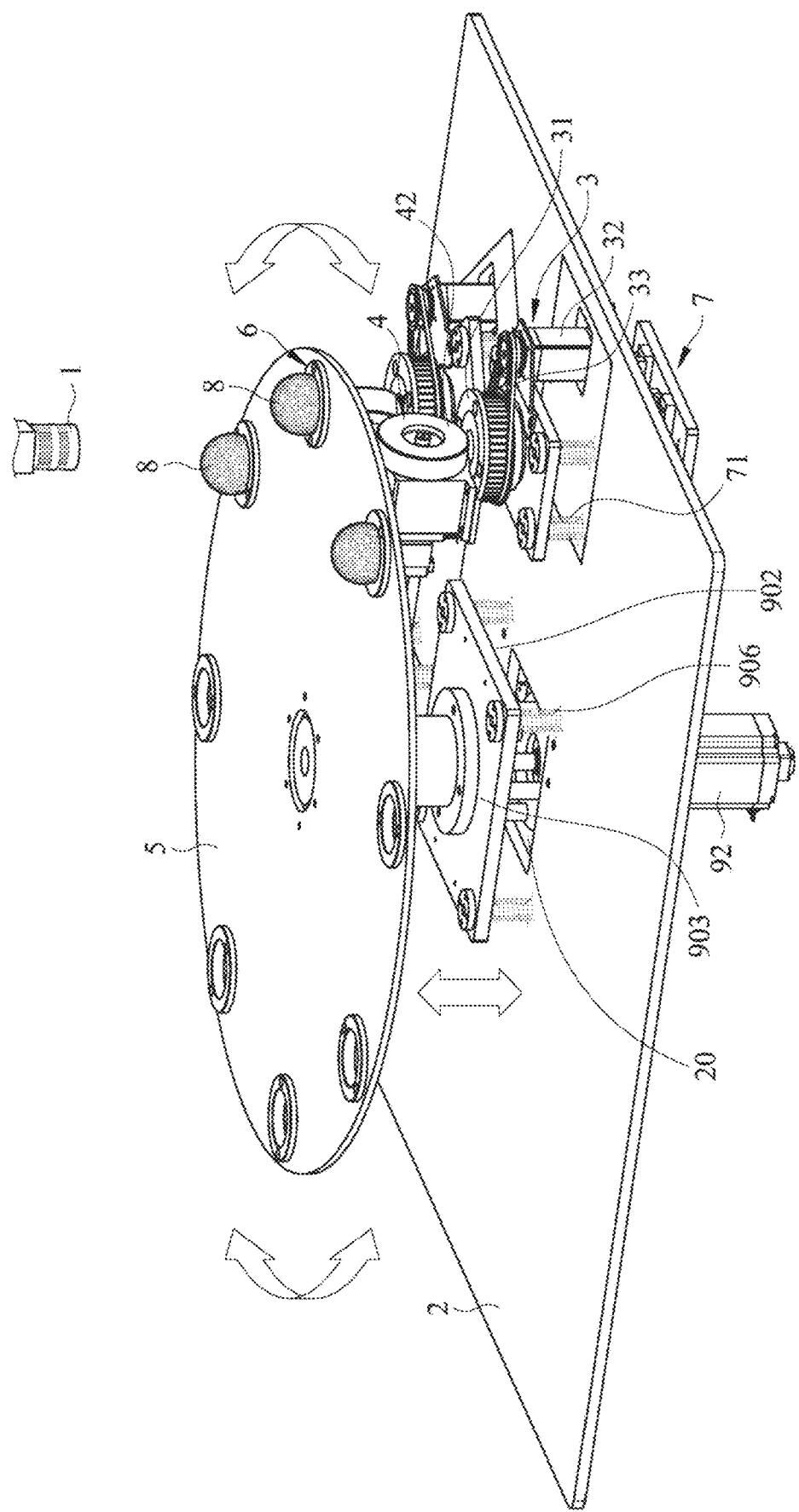
FIG. 7 is a schematic view showing the second rotation mechanism driving the tray to be rotated through the motor output shaft, the shaft connector and the rotation disk input shaft according to one embodiment of the present invention.
Figure 8:
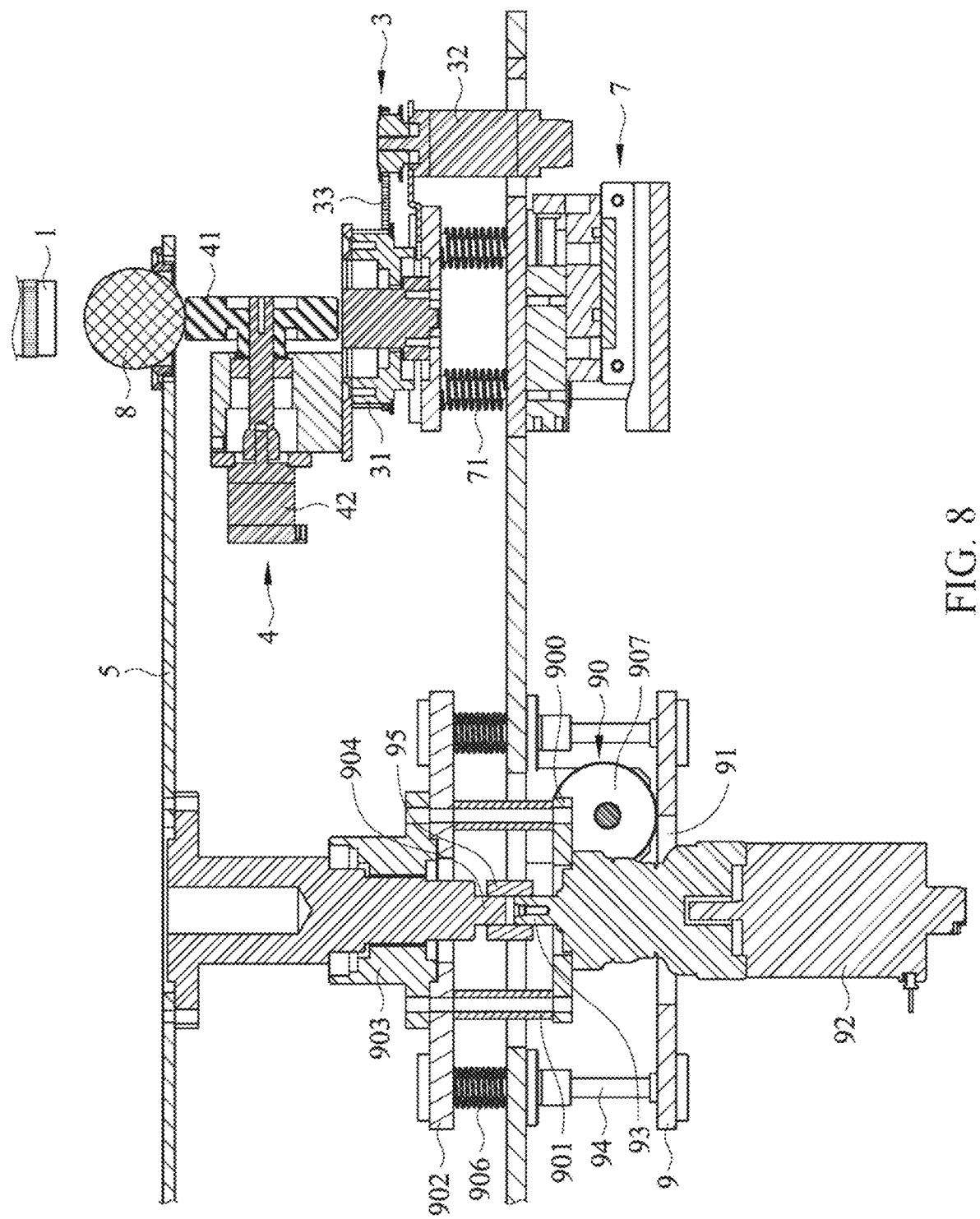
FIG. 8 is a schematic view showing the second elevation device enabling the elevation plate and the tray to be downwardly displaced through the eccentric wheel downwardly pressing the bottom plate and through the bottom support rod and the second guiding columns according to one embodiment of the present invention.
Figure 9:
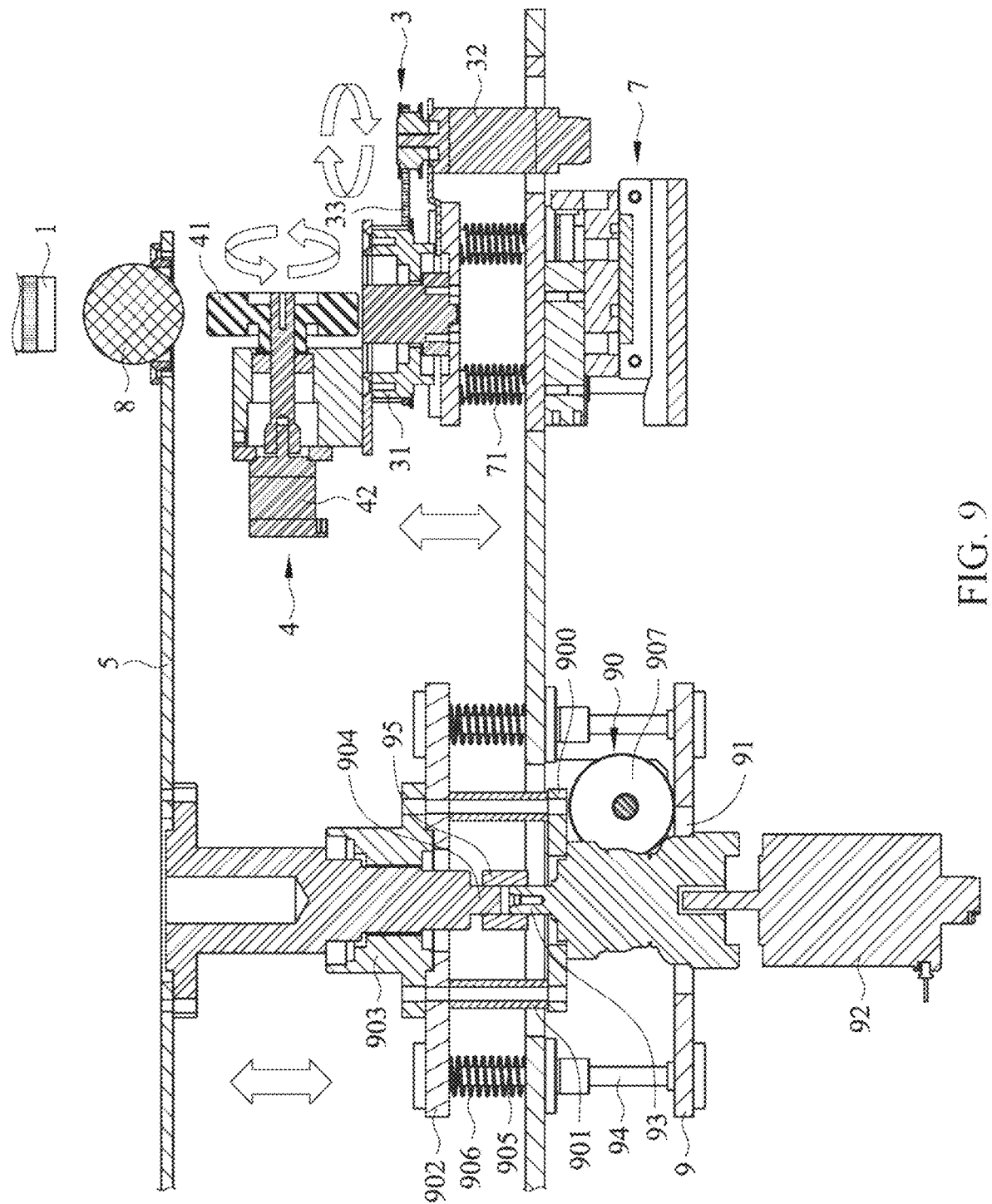
FIG. 9 is a schematic view showing the tray of FIG. 8 being upwardly elevated and the rolling wheel of the rolling device being rotated to an angle through rotations of the rotation mechanism according to one embodiment of the present invention.
Figure 10:
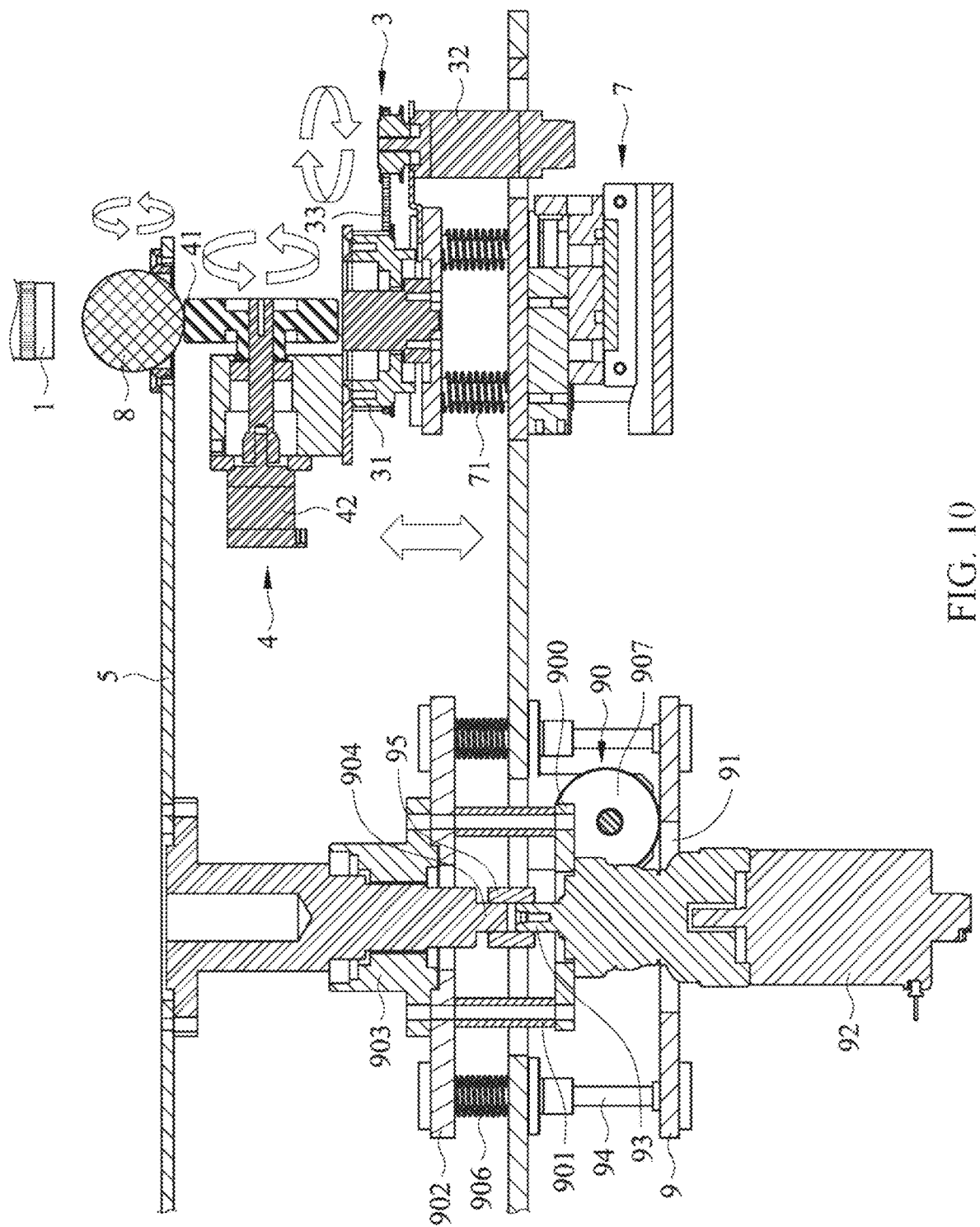
FIG. 10 is a schematic view showing the tray of FIG. 9 being downwardly displaced and the spherical body disposed on the tray being rotated through the rolling wheel of the rolling device according to one embodiment of the present invention.

Please refer from FIG. 1 to FIG. 10, wherein FIG. 1 is a perspective exploded view according to the present invention; FIG. 2 is a perspective view showing the assembly according to the present invention; FIG. 3 is a cross sectional view showing the assembly according to the present invention; FIG. 4 is a schematic view showing the quantity of the annular shape of which the arc-shaped member of the spherical body holding ring being consisted being two according to one embodiment of the present invention; FIG. 5 is a schematic view showing the quantity of the annular shape of which the arc-shaped member of the spherical body holding ring being consisted being three according to one embodiment of the present invention; FIG. 6 is a schematic view showing the quantity of the annular shape of which the arc-shaped member of the spherical body holding ring being consisted being four according to one embodiment of the present invention; FIG. 7 is a schematic view showing the second rotation mechanism driving the tray to be rotated through the motor output shaft, the shaft connector and the rotation disk input shaft according to one embodiment of the present invention; FIG. 8 is a schematic view showing the second elevation device enabling the elevation plate and the tray to be downwardly displaced through the eccentric wheel downwardly pressing the bottom plate and through the bottom support rod and the second guiding columns according to one embodiment of the present invention; FIG. 9 is a schematic view showing the tray of FIG. 8 being upwardly elevated and the rolling wheel of the rolling device being rotated to an angle through rotations of the rotation mechanism according to one embodiment of the present invention; and FIG. 10 is a schematic view showing the tray of FIG. 9 being downwardly displaced and the spherical body disposed on the tray being rotated through the rolling wheel of the rolling device according to one embodiment of the present invention. According to one preferred embodiment of the present invention, a detecting device for use in multiple-DOF (degree of freedom) spherical body is disclosed. The detecting device for use in multiple-DOF (degree of freedom) spherical body is applied in a camera 1 and a spherical body 8, and includes: a fasten plate 2, disposed at a lower end of the camera 1; at least one rotation mechanism 3, disposed at an upper end defined at a periphery of the fasten plate 2 and having a passive wheel 31, a rotation motor 32 disposed corresponding to the passive wheel 31 and a transmission member 33 connecting to the passive wheel 31 and the rotation motor 32; the passive wheel 31 of the rotation mechanism 3 is a gear or a pulley, the transmission member 33 of the rotation mechanism 3 is a gear or a belt; at least one rolling device 4, disposed at an upper end of the passive wheel 31 of the rotation mechanism 3 and having a rolling wheel 41 and a rolling motor 42, wherein a radial center of the rolling wheel 41 is corresponding to a center of the passive wheel 31 of the rolling device 4; at least one elevation device 7, disposed at a lower end of the fasten plate 2, wherein the elevation device 7 is sleeved with a buffer spring 71 so as to be connected to a lower end of the rotation mechanism 3 through a plurality of guiding columns 70 extended from an upper end of the fasten plate 2; according to this embodiment, the elevation device 7 is an elevation cylinder, but what shall be addressed is that the scope of the present invention is not limited to be above-mentioned elevation cylinder.

The present invention is characterized in that: a center of the fasten plate 2 has a middle penetrated hole 20, a bottom plate 9 is disposed at the lower end of the fasten plate 2 and a plurality of bottom support rods 94 are disposed between the bottom plate and the fasten plate 2, a center of the bottom plate 9 has a bottom penetrated hole 91 which is corresponding to the middle penetrated hole 20 of the fasten plate 2, a lower end of the bottom plate 9 is disposed with a second rotation mechanism 92 corresponding to the bottom penetrated hole 91; according to this embodiment, the second rotation mechanism 92 is a rotation motor, but what shall be addressed is that the scope of the present invention is not limited to the above-mentioned rotation motor, an upper end of the second rotation mechanism 92 is disposed with a second fasten plate 900, a center of the second fasten plate 900 of the second rotation mechanism 92 is upwardly extended with a motor output shaft 93 which penetrates the bottom penetrated hole 91 and the middle penetrated hole 20, an upper end of the fasten plate 2 is disposed with an elevation plate 902, a periphery of the elevation plate 902 is downwardly extended with a plurality of second guiding columns 905 which penetrates the fasten plate 2 and is connected to the bottom support rod 94, the second guiding columns 905 are respectively disposed with a buffer spring 906, an upper end of the elevation plate 902 is disposed with a second top rotation disk set 903, one side defined at a lower end of the fasten plate 2 is disposed with a second elevation device 90 which pushes the bottom plate 9 and allows the elevation plate 902 and the bottom plate 9 to be elevated, the second elevation device 90 has an eccentric wheel 907 and an elevation motor or a cylinder which pushes the bottom plate 9 for elevations, but what shall be addressed is that the scope of the present invention is not limited to the above-mentioned arrangement; a plurality of connection guiding columns 901 penetrating the middle penetrated hole 20 are disposed between the elevation plate 902 and the second fasten plate 900 of the second rotation mechanism 92, an upper end of the second top rotation disk set 903 is disposed with a tray 5 and a center thereof is disposed with a rotation disk input shaft 904 extending to a lower end of the second top rotation disk set 903; according to this embodiment, the tray 5 is formed in a round-disk shape, but what shall be addressed is that the scope of the present invention is not limited to the above-mentioned round-disk shape; a shaft connector 95 is disposed between the rotation disk input shaft 904 and the motor output shaft 93 of the second rotation mechanism 92, a periphery of the tray 5 is disposed with a plurality of through holes 51 which are corresponding to an upper end of the rolling wheel 41 of the rolling device 4 and allows a lower end of the spherical body 8 to be mounted, an upper end of each of the through holes 51 is disposed with at least one spherical body holding ring 6, the spherical body holding ring 6 is disposed with an opening 61 which is corresponding to the through hole 51 and allows a lower portion of the spherical body 8 to be mounted, the spherical body holding ring 6 is formed in an annular status consisted of at least one arc-shaped member 62; the spherical body holding ring 6 is disposed with a concave part 63 which is adjacent to a periphery of the opening 61, the arc-shaped member 62 of the spherical body holding ring 61 is formed in an annular shape consisted of single arc-shaped member 62 (as shown in FIG. 1, FIG. 2 and FIG. 3) or formed in an annular shape consisted of a multi-staged arc-shaped member 62, and the quantity of the annular shape of which the arc-shaped member 62 of the spherical body holding ring 6 is consisted is two, three or four (as shown in FIG. 4, FIG. 6 and FIG. 6).

According to the present invention, if the rolling wheel 41 is desired to be rotated in multiple angles, the tray 5 is oriented to face upwardly, the lower end of the spherical body 8 disposed on the tray 5 is separated from the rolling wheel 41 (as shown in FIG. 1, FIG. 2 and FIG. 3), at this moment, the rolling device 4 and the rolling wheel 41 are able to generate multiple rotation angle so as to be rotated through the rotation mechanism 3 (as shown in FIG. 9), or the bottom support rod 94 mutually connected to the bottom plate 9 and the second guiding columns 905 able to be drive the elevation plate 902, the second top rotation disk set 903 and the tray 5 to be descended through the rotations of the eccentric wheel 907 of the second elevation device 90, which can be an elevation motor or a cylinder, and downwardly pushing the bottom plate 9 (as shown in FIG. 8); through being in contact with the rotation mechanism 3, the rolling device 4 and the rolling wheel 41 being in contact with the lower end of the spherical body 8, the rolling motor 42 of the rolling device 4 drives the rolling wheel 41 to be rotated to an angle, when the spherical body 8 can be driven to rotate while the rolling wheel 41 being in contact with the spherical body 8 (as shown in FIG. 10), so that an elevation operation can be repeatedly performed for allowing the rolling wheel 41 to be turned and rotated in various angles, and the camera 1 disposed at the upper end thereof can be used for detecting the spherical body 8 which rotates in a multiple degree of freedom (DOF), the tray 5 can be rotated by the second rotation mechanism 92, which can be a rotation motor, through the shaft connector 95 connected with the rotation disk input shaft 904 and the motor output shaft 93 of the second rotation mechanism 92, thereby enabling the tray 5 to be sequentially rotated (as shown in FIG. 7).

Accordingly, with the second elevation device 90 and the second rotation mechanism 92 of the fasten plate 2 being correspondingly connected to the bottom plate 9 and the elevation plate 902 and the tray 5, the present invention can achieve following features: by utilizing the second elevation device 90 and the second rotation mechanism 92, and providing the elevations of the elevation plate 902 having the second guiding columns 905 and the tray 5, which is corresponding to the rolling wheel 41 and having the through holes 51 and the spherical body holding ring 6, being elevated and rotated, the spherical body 8 is able to rotate in the multiple DOF status for allowing the camera 1 to detect in various directions; as such, effects of effectively enhancing the operation convenience and allowing a plurality of the spherical bodies 8 to be rapidly and synchronously detected can be achieved. Accordingly, the present invention is novel and more practical in use comparing to prior arts.

What is claimed is:

1. A detecting device for use in multiple-DOF spherical body, applied in a camera and a spherical body, and including:

a fasten plate, disposed at a lower end of the camera; at least one rotation mechanism, disposed at an upper end defined at a periphery of the fasten plate and having a passive wheel, a rotation motor corresponding to the passive wheel, and a transmission member connected to the passive wheel and the rotation motor; at least one rolling device, disposed at an upper end of the passive wheel of the rotation mechanism and having a rolling wheel and a rolling motor, wherein a radial center of the rolling wheel is corresponding to a center of the passive wheel of the rolling device; and at least one elevation device, disposed at a lower end of the fasten plate, wherein the elevation device is connected to a lower end of the rotation mechanism through a plurality of guiding columns upwardly extending towards the upper end of the fasten plate and being disposed with a buffer spring;

and characterized in that: a center of the fasten plate has a middle penetrated hole, a lower end of the fasten plate is disposed with a bottom plate and a plurality of bottom support rods are disposed between the bottom plate and the fasten plate, a center of the bottom plate has a bottom penetrated hole corresponding to the middle penetrated hole of the fasten plate, a lower end of the bottom plate is disposed with a second rotation mechanism corresponding to the bottom penetrated hole, an upper end of the second rotation mechanism is disposed with a second fasten plate, a center of the second fasten plate of the second rotation mechanism is disposed with a motor output shaft upwardly extending and penetrating the bottom penetrated hole and the middle penetrated hole, an upper end of the fasten plate is disposed with an elevation plate, a periphery of the elevation plate is downwardly extended with a plurality of second guiding columns penetrating the fasten plate and connected to the bottom support rod, the second guiding columns are respectively disposed with a buffer spring, an upper end of the elevation plate is disposed with a second top rotation disk set, one side defined at a lower end of the fasten plate is disposed with a second elevation device which pushes the bottom plate and allows the elevation plate and the bottom plate to be elevated, a plurality of connection guiding columns penetrating the middle penetrated hole are disposed between the elevation plate and the second fasten plate of the second rotation mechanism, an upper end of the second top rotation disk set is disposed with a tray and a center thereof is disposed with a rotation disk input shaft extending to a lower end of the second top rotation disk set, a shaft connector is disposed between the rotation disk input shaft and the motor output shaft of the second rotation mechanism, a periphery of the tray is disposed with a plurality of through holes which are corresponding to an upper end of the rolling wheel of the rolling device and allows a lower end of the spherical body to be mounted, an upper end of each of the through holes is disposed with at least one spherical body holding ring, the spherical body holding ring is disposed with an opening corresponding to the through hole and allowing a lower portion of the spherical body to be mounted, and the spherical body holding ring is formed in an annular shape consisted of at least one arc-shaped member.

2. The detecting device for use in multiple-DOF spherical body as claimed in claim 1, wherein the tray is formed in a round-disk shape.

3. The detecting device for use in multiple-DOF spherical body as claimed in claim 1, wherein the passive wheel of the rotation mechanism is a gear or a pulley.

4. The detecting device for use in multiple-DOF spherical body as claimed in claim 1, wherein, and the transmission member of the rotation mechanism is a gear or a belt.

5. The detecting device for use in multiple-DOF spherical body as claimed in claim 1, wherein the spherical body holding ring is disposed with a concave part adjacent to a periphery of the opening.

6. The detecting device for use in multiple-DOF spherical body as claimed in claim 1, wherein the arc-shaped member of the spherical body holding ring is formed in an annular shape consisted of single or multi-staged arc-shaped member.

7. The detecting device for use in multiple-DOF spherical body as claimed in claim 6, wherein the quantity of the annular shape of which the multi-staged arc-shaped member of the spherical body holding ring is consisted is two, three or four.

8. The detecting device for use in multiple-DOF spherical body as claimed in claim 1, wherein the second elevation device has an eccentric wheel and an elevation motor or a cylinder which pushes the bottom plate for elevations.

* * * * *